United States Patent [19]

Rodgers

[11] Patent Number: 5,123,239
[45] Date of Patent: Jun. 23, 1992

[54] METHOD OF STARTING A GAS TURBINE ENGINE

[75] Inventor: Colin Rodgers, San Diego

[73] Assignee: Sundstrand Corporation, Rockford, Ill.

[21] Appl. No.: 655,116

[22] Filed: Feb. 14, 1991

[51] Int. Cl.⁵ .............................................. F02C 7/268
[52] U.S. Cl. ................................. 60/39.02; 60/39.142
[58] Field of Search ............. 60/39.02, 39.141, 39.142; 74/6, 7 R

[56] References Cited

U.S. PATENT DOCUMENTS

| | | |
|---|---|---|
| 3,020,716 | 2/1962 | Greenly . |
| 3,087,305 | 4/1963 | Hertzog ............................ 60/39.142 |
| 3,176,959 | 4/1965 | Ellenberger ...................... 60/39.142 |
| 4,461,143 | 7/1984 | Shutt . |
| 5,042,963 | 8/1991 | Sorenson et al. .................. 60/39.142 |

*Primary Examiner*—Louis J. Casaregola
*Attorney, Agent, or Firm*—Wood, Phillips, Mason, Recktenwald & VanSanten

[57] ABSTRACT

A method of starting a gas turbine engine eliminating the need for oversizing a starter motor or the like to attain a proper transition through the "pinch point" includes the steps of applying a torque from an external source to the gas turbine engine (10) to accelerate the same toward a self sustaining speed, igniting fuel in the engine (10) at a pre-determined speed less than the self-sustaining speed, and at or about the time of fuel ignition, momentarily increasing the torque applied to accelerate the engine (10). The acceleration torque and momentary increase can be achieved by applying torque from a gas turbine containing auxiliary power unit (20) to an engine (10) either mechanically or pneumatically and then overspeeding and/or increasing the turbine inlet temperature of the gas turbine within the APU (20) to achieve a momentary burst of torque.

7 Claims, 1 Drawing Sheet

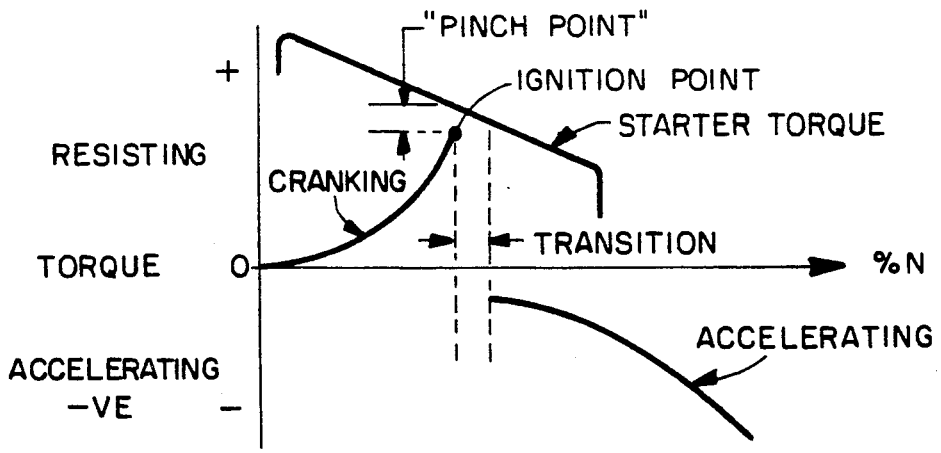
FIG. I (PRIOR ART)
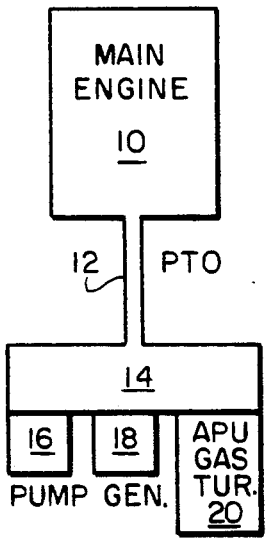
FIG. 2
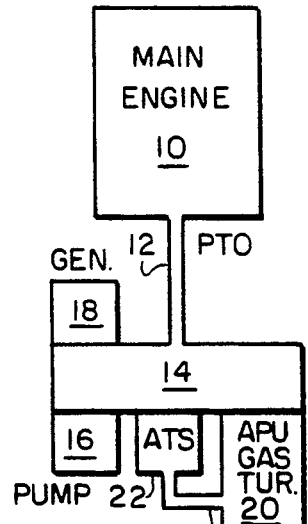
FIG. 3
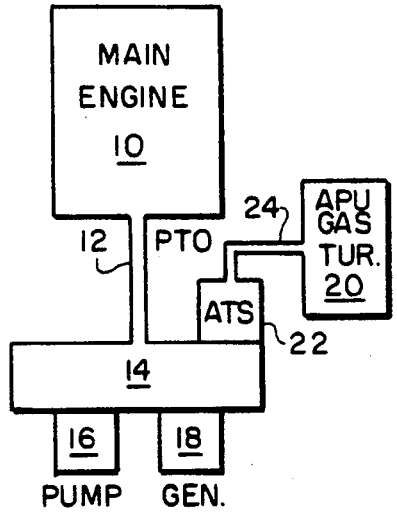
FIG. 4
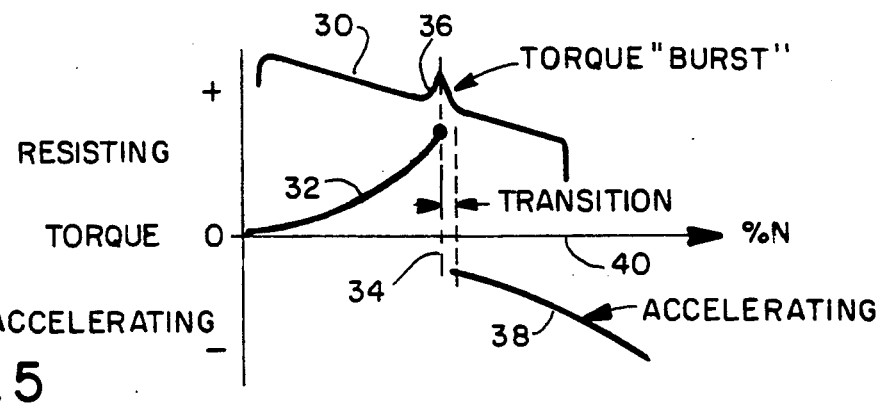
FIG. 5

METHOD OF STARTING A GAS TURBINE ENGINE

FIELD OF THE INVENTION

This invention relates to the starting of gas turbine engines, and while not limited thereto, is principally concerned with the starting of the main propulsion engines on an aircraft.

BACKGROUND OF THE INVENTION

Gas turbine engines are typically started by the use of an externally applied cranking torque. In the usual case, an electric, hydraulic or pneumatic starter motor is coupled via the usual power take off and gear box to the shaft of the gas turbine. Starter motors of this sort are sized to accelerate the gas turbine engine to a so-called "light-off" speed whereat fuel is injected into the combustor of the turbine and ignited.

The resulting gases of combustion then initiate an acceleration process, accelerating the turbine wheel and compressor of the gas turbine engine, still with the assistance of the externally applied torque from the starter. This is continued until such time as a self-sustaining speed is reached, at which time, the externally applied torque from the starter may be removed.

There is, of course, a transition as the turbine progresses from an unfired to a fired state. During this transition, there is a corresponding change in torque within the turbine itself As may be ascertained by reference to FIG. 1, which illustrates a plot of torque against shaft speed as a percent of normal operating speed in the starting of a typical gas turbine, as the gas turbine is accelerated from standstill, an increasing resisting torque due to the resistance to cranking is present. The torque produced by a typical starter is, at the same time, decreasing At the time of ignition, after a short transition, there is a change in torque from a positive or resisting cranking torque to negative or accelerating torque as the gases of combustion resulting from ignition begin to drive the turbine.

A so-called "pinch point" represents the difference in torque between that provided by the starter and the resisting or positive cranking torque of the engine just prior to ignition. This "pinch point" effectively dictates the sizing of the starter motor and its energy requirements. That is to say, the starter must be sized and provided with enough energy to accelerate the turbine past the ignition point so that the engine operation will move to the negative torque position to achieve acceleration toward self-sustaining speed.

Frequently, sizing the starter to accomplish this job results in excessive torque capacity within the starter for all, but operating conditions right around the pinch point. This, of course, translates to additional bulk and weight in the starter system and neither is desirable in many applications, particularly in aircraft applications In such applications, additional bulk may increase the frontal area of an engine nacelle or the like thereby increasing drag while an increase in weight will reduce the useful load that may be carried by the aircraft.

Where the starter is sized somewhat smaller to avoid these difficulties, the torque output may be marginal at the pinch point and result in a so-called "hung start" where combustion is achieved within the gas turbine but the same will not accelerate.

The present invention is directed to overcoming one or more of the above problems.

SUMMARY OF THE INVENTION

It is the principal object of the invention to provide a new and improved method of starting a gas turbine engine. More particularly, it is an object of the invention to provide a method of starting a gas turbine engine that allows the use of a smaller starting system and yet avoids the possibility of "hung starts".

An exemplary embodiment of the invention achieves the foregoing in a method of starting a gas turbine engine which includes the steps of:

a) applying a torque from an external source to a gas turbine engine to accelerate the same toward a self-sustaining speed;

b) igniting fuel in the engine at a pre-determined speed less than the self-sustaining speed; and c) at or about the time of the initiation of the fuel igniting step, momentarily increasing the torque applied during the acceleration step.

By momentarily increasing the torque at the time of ignition, a greater torque is applied for cranking purposes at the "pinch point" than is normally available and can be obtained, on a momentary basis, from a smaller starter motor than would be required to achieve reliable starts during prior art starting sequences.

In a preferred embodiment, the external source is an operating gas turbine and the step of accelerating is performed by coupling the operating gas turbine to the gas turbine to be started.

The invention contemplates that the momentary increase in torque may be obtained by momentarily overspeeding the operating gas turbine.

Alternatively, the momentary increase in torque may be performed by momentarily increasing the turbine inlet temperature of the gases flowing in the operating gas turbine.

As still a third alternative, the momentary increase in torque may be obtained by both momentarily increasing the turbine inlet temperature of gases flowing within the operating gas turbine as well as overspeeding the operating gas turbine.

In a highly preferred embodiment, the gas turbine to be started is the main propulsion engine of an aircraft which additionally includes an auxiliary power unit which in turn includes a relatively small gas turbine. The method includes the step of initiating operation of the auxiliary power unit to provide the source of torque and applying the torque from the auxiliary power unit to the main propulsion engine for acceleration purposes.

Other objects and advantages will become apparent from the following specification taken in connection with the accompanying drawings.

DESCRIPTION OF THE DRAWINGS

FIG. 1 is a plot of torque versus percent of engine speed which typifies conditions during the starting of a gas turbine engine according to prior art techniques;

FIG. 2 is a block diagram illustrating one typical configuration of a main propulsion engine for an aircraft and accessories related thereto, including an auxiliary power unit (APU);

FIG. 3 is a view similar to FIG. 2, but illustrating a different typical configuration;

FIG. 4 is a view similar to FIGS. 2 and 3, but illustrating still another typical configuration; and FIG. 5 is a plot of torque against percent of engine speed typifying conditions found during a starting sequence of a gas turbine engine when the engine is started according to the invention.

DESCRIPTION OF THE PREFERRED EMBODIMENT

The invention, in its broadest sense, is a method of starting a gas turbine engine by providing what might be termed a transient torque burst at the so-called pinch point. The provision of such a torque burst offers potential advantages of decreased start time, reduced starter system size, and decreased probability of a so-called "hung start". While the transient torque burst can be achieved in virtually any system having a starter motor which may be momentarily operated to provide torque levels in excess of the normal maximum provided during normal operating conditions without damage to the starter motor or system, in a preferred embodiment of the invention, the gas turbine engine to be started will be a main propulsion engine of an aircraft.

In FIGS. 2, 3 and 4, such a main engine is designated 10 and each includes a power take off 12 as is well known. In the usual case, the power take off is connected to a transmission 14 which in turn is employed for driving accessories such as one or more hydraulic pumps 16 and one or more electrical generators 18. In the configuration illustrated in FIG. 2, an auxiliary power unit or APU 20, which includes a small gas turbine engine, is mechanically coupled to the transmission 14 via a mechanical torque converter or the like. The same may be utilized to drive the pump 16 and generator 18 when they are not being driven by the main engine 10. In such a case, the main engine 10 will typically be decoupled from the transmission 14. However, the APU 20 may be coupled to the engine 10 and utilized to provide an input torque to the main engine 10 for starting purposes as well as is known.

In the configuration illustrated in FIG. 3, an auxiliary power unit 20 is likewise mounted on the transmission 14 and may be utilized to drive a pump 16 and a generator 18 under the same circumstances. In this configuration, however, a so-called air turbine starter 22 is connected to the transmission 14 and when provided with air from any suitable source, will accelerate the main engine 10 for starting purposes. As is well known, in many aircraft constructions, the air turbine starter 22 may receive compressed air from a so-called ground cart or the like. Alternatively, and according to the invention, such compressed air is received as bleed air from the auxiliary power unit 20 along a line 24. It will also be appreciated that the mass flow rate of the bleed air received from the APU 20 will be proportional to the torque available from the APU 20 and determine the torque applied to the main engine 10.

Still another configuration is illustrated in FIG. 4. In this configuration, the APU 20 is not mounted on the transmission 14, but may be located remotely therefrom as desired. In such a case, the APU 20 will have accessories such as the pump 16 and generator 18 connected directly to it to be driven thereby. The same are not shown in FIG. 4 for clarity.

The configuration of FIG. 4 also includes an air turbine starter 22 and a bleed air conduit 24 extends from the APU 20 to the air turbine starter 22 to provide bleed air thereto for use in starting the main turbine engine.

Thus, in FIG. 2, a mechanical link between the APU 20 and the main engine 10 is established while pneumatic links are present in the configurations of FIGS. 3 and 4. Through these links, torque produced by the APU 20 may be utilized to accelerate the main engine 10 toward an ignition speed and past the same to a self-sustaining speed. The torque provided by the APU is illustrated by a curve 30 in FIG. 5 and the resisting torque of the main engine is shown by a curve 32. The ignition point is illustrated at 34 and at or just prior to the ignition point 34, that is, as the pinch point is approached, the transient burst of torque is provided and is illustrated by a peak of short duration in the line 30. This peak is designated 36. This burst of torque assures the availability of the necessary torque to accelerate the main engine 10 through the transition phase to the negative torque or accelerating condition, curve 38, whereat the engine continues to accelerate toward self sustaining speed which is shown at a point 40. It will be appreciated that the transition zone will be somewhat narrowed because the increased torque during the torque burst will hasten the onset of the negative torque phase of the starting operation. This same factor will tend to shorten the overall length of the starting procedure as well.

The torque burst 36 may be achieved by momentarily overspeeding the gas turbine forming part of the APU 20. Alternatively, it may be obtained by momentarily increasing the turbine inlet temperature of the hot gases flowing from the combustor of the APU turbine to the turbine wheel thereof. As still a further alternative, the increase in torque may be obtained by both increasing the turbine inlet temperature and overspeeding.

In a typical gas turbine, an increase in speed or turbine inlet temperature can provide up to a three percent increase in the output power of the turbine forming part of the APU 20 and this is sufficient to provide the torque burst required. Because the torque burst is momentary, it can be tolerated within the gas turbine forming the APU without damage.

The conventional fuel controls for scheduling fuel and/or the acceleration rate of a gas turbine engine such as the main turbine engine 10 may be utilized to sense the percent of speed attained by the engine during the starting sequence either by sensing speed at the power take off 12 or sensing the acceleration rate of the turbine wheel of the main engine. Alternatively, a closed loop servo system may be employed to sense the fall off in the rate of acceleration that occurs as the pinch point is approached. This information is conventionally employed to cause ignition or "light-off" and may also be processed and utilized to modify the fuel schedule for the gas turbine within the APU 20 to cause momentary overfueling or the like which will result in the creation of one or more of the previously mentioned conditions.

Thus, the invention takes advantage of the increased torque output provided by a gas turbine when the turbine inlet temperature is increased above the normal maximum or the engine is overspeeded above the normal maximum, conditions with which those skilled in the art are readily familiar and which are almost universally regarded as ones to be avoided. Through the unique application of the results of these conditions to the main propulsion engine or the like during the starting sequence thereof, the overall size of the starter system may be reduced to provide weight or bulk advantages while decreasing the possibility of hung starts.

I claim:

1. A method of starting a gas turbine engine comprising the steps of:

a) applying a torque from an external source to a gas turbine engine to accelerate the same toward a self-sustaining speed;

b) igniting fuel in said engine at a predetermined speed less than said self-sustaining speed; and c) at or about the time of initiation of step b), momentarily increasing the torque applied during the performance of step a).

2. The method of claim 1 wherein said external source is an operating gas turbine and step a) is performed by coupling the operating gas turbine to the gas turbine to be started.

3. The method of claim 2 wherein step c) is performed by momentarily overspeeding said operating gas turbine.

4. The method of claim 2 wherein step c) is performed by momentarily increasing the turbine inlet temperature of the gases flowing in said operating gas turbine.

5. The method of claim 2 wherein step c) is performed by momentarily increasing the turbine inlet temperature in and overspeeding said operating gas turbine.

6. A method of starting a main propulsion engine of an aircraft of the gas turbine type wherein the aircraft includes an auxiliary power unit driven by a relatively small gas turbine comprising the steps of:

a) initiating operation of said auxiliary power unit so that said relatively small gas turbine provides a source of torque;

b) applying the torque from the auxiliary power unit to the main propulsion engine to accelerate the main engine toward a self-sustaining speed;

c) igniting fuel in said main engine at a predetermined speed less than said self-sustaining speed; and d) at or about the time of initiation of step c), momentarily increasing the torque applied during the performance of step b).

7. The method of claim 6 wherein step d) is performed by i) momentarily overspeeding the relatively small gas turbine, or ii) momentarily increasing the turbine inlet temperature of gas flowing within the relatively small gas turbine, or iii) both momentarily overspeeding the relatively small gas turbine and momentarily increasing the turbine inlet temperature of gas flowing within the relatively small gas turbine.

* * * * *